(No Model.)
4 Sheets—Sheet 3.
W. BUTLER.
THRASHING MACHINE.
No. 540,576.
Patented June 4, 1895.
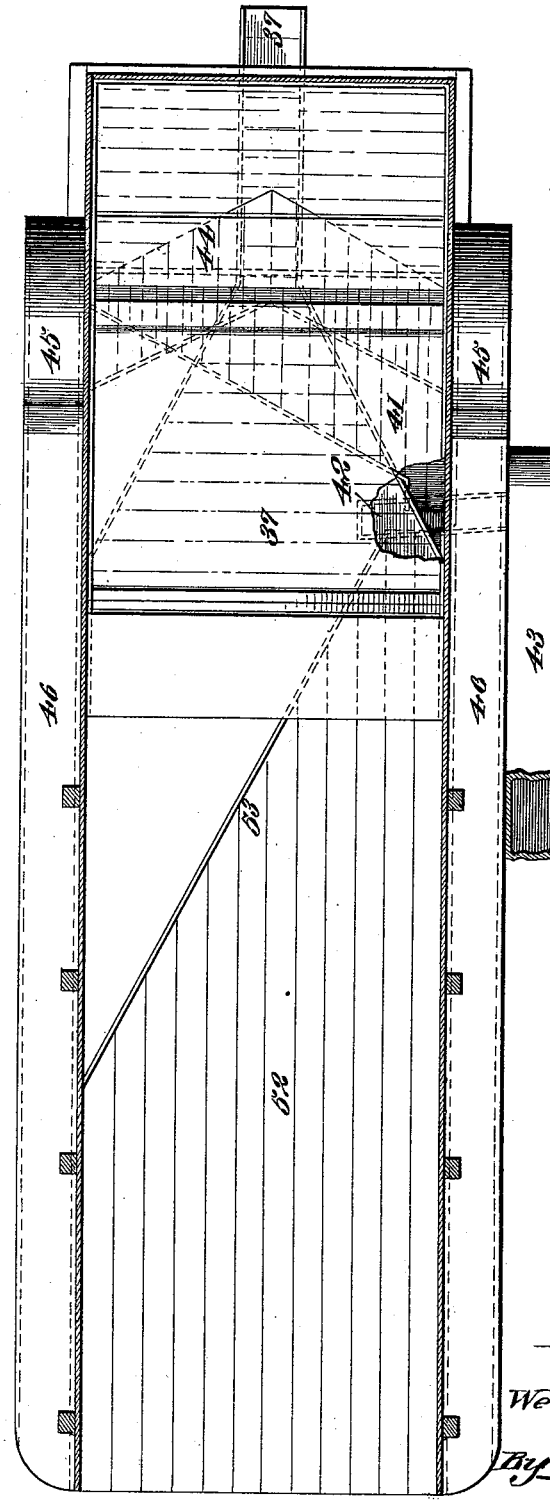
Fig. III.
Attest
A. M. Ebersole
C. G. Edwards.
Inventor:
Wesley Butler.
by Knight Bros
Attys (No Model.) 4 Sheets—Sheet 4.
W. BUTLER.
THRASHING MACHINE.
No. 540,576. Patented June 4, 1895.
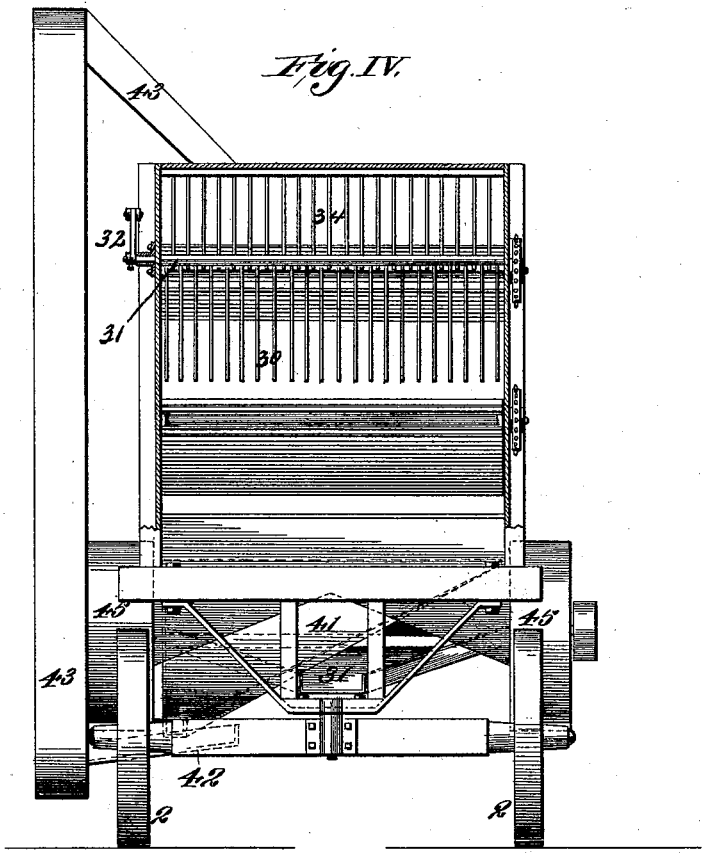
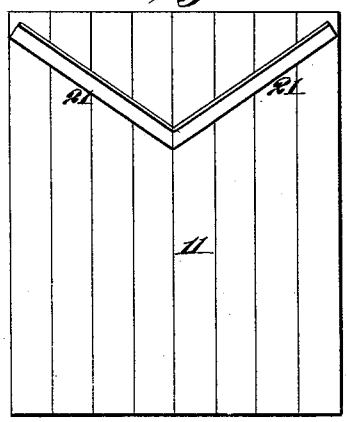
Attest:
A. M. Ebersole
C. G. Edwards
Inventor:
Wesley Butler.
By Knight Bro.
Attys

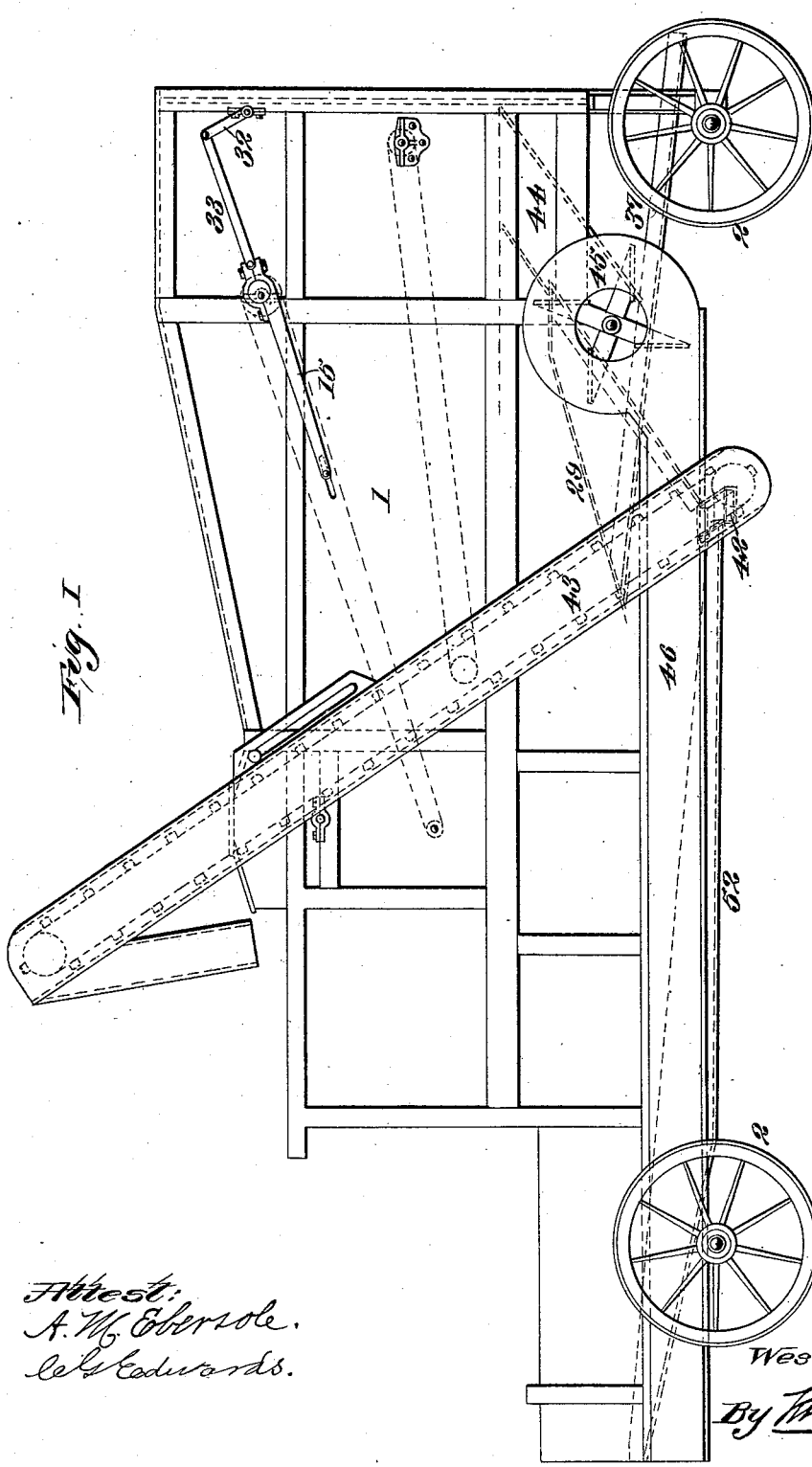

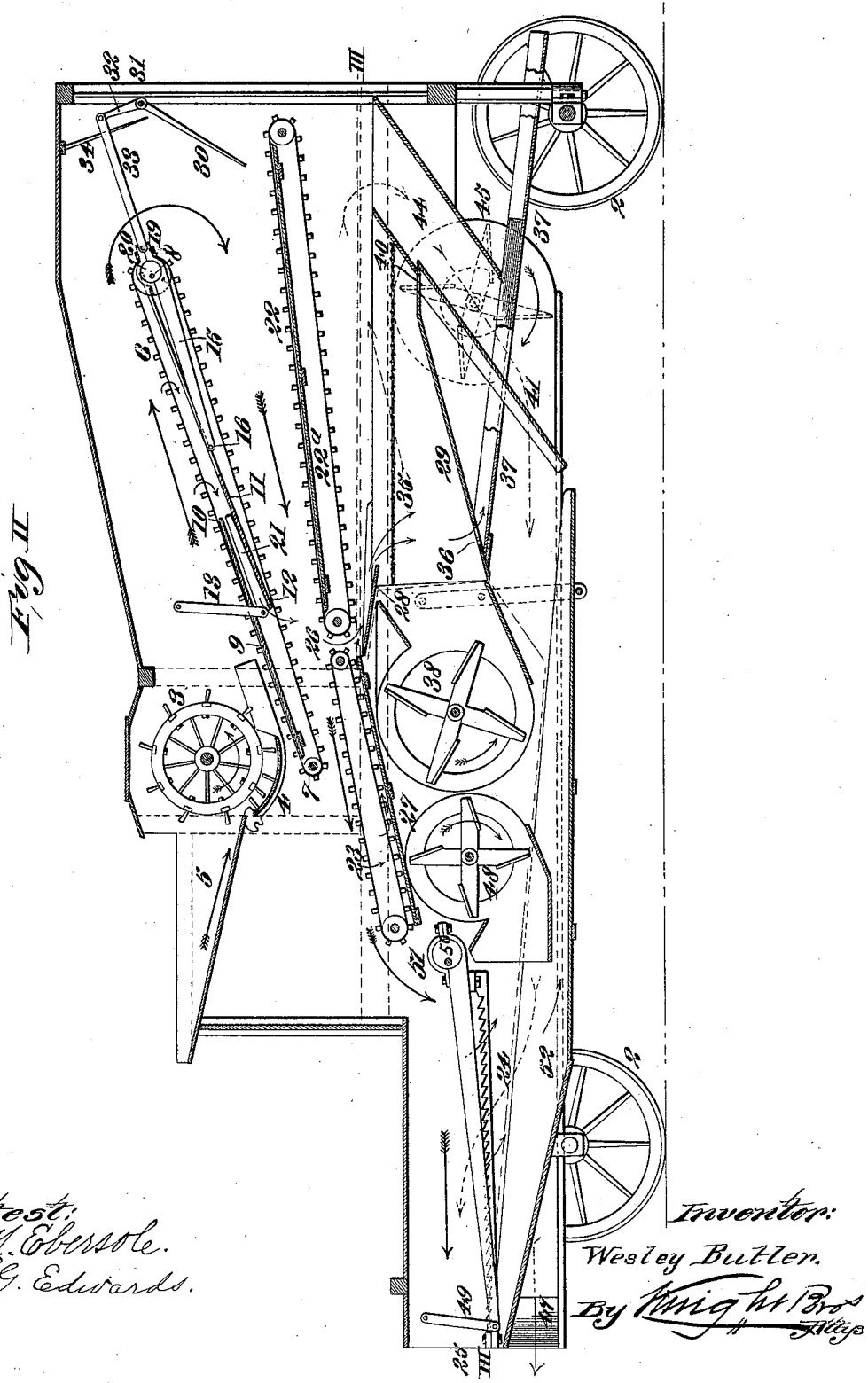

UNITED STATES PATENT OFFICE.

WESLEY BUTLER, OF DAVENPORT, IOWA, ASSIGNOR TO THE JOHN S. DAVIS' SONS, OF SAME PLACE.

THRASHING-MACHINE.

SPECIFICATION forming part of Letters Patent No. 540,576, dated June 4, 1895.

Application filed April 9, 1894. Serial No. 506,796. (No model.)

*To all whom it may concern:*

Be it known that I, WESLEY BUTLER, of Davenport, in the county of Scott and State of Iowa, have invented certain new and useful Improvements in Thrashing-Machines, of which the following is a full, clear, and exact description, reference being had to the accompanying drawings, forming part of this specification.

My invention relates to certain improvements in thrashing machines, one of the main objects being to turn the straw within the machine so that after passing rearwardly from the cylinder, it is passed forwardly again before leaving the machine, and as it is turned from the rearward to the forward course of its travel, it is reversed or turned upside down, so that the grain is more effectually dislodged or separated from the straw than in a machine where the straw passes without reversing from the cylinder to the rear of the machine, where it is discharged. By returning the straw within the machine, the length of travel of the straw is materially increased, while the length of the machine is diminished.

A second object of my machine is to increase its separating capacity, which is accomplished by increasing the distance which the straw has to travel within the machine. In a machine such as I have constructed the capacity for separating is doubled compared to the separating capacity of the present style of machine.

A third object of my invention is to discharge the straw and chaff at the front end of the machine and the grain at the rear end, consequently keeping it free from the dust, dirt, and trash flying about, and allowing it to be quickly and easily handled without interfering with the feeding of the machine, thus overcoming one of the greatest disadvantages incident to the present style of machine which discharges the grain at one side thereof. A further advantage of having the straw and chaff at the front of the machine and away from the grain is that the feeder and those working about the machine are out of the way of the chaff, dust and dirt flying about, which is very objectionable and injurious. Furthermore the feeder is enabled to face the engineer, who has to act in unison with the feeder, so that the machine can be started and stopped quickly which is frequently necessary.

My invention consists in certain devices and combinations of devices whereby the principal objects of the invention above stated are secured, and in certain features of novelty hereinafter fully described and pointed out in the claims.

Figure I is a side elevation of my improved machine. Fig. II is a vertical longitudinal section of the machine. Fig. III is a horizontal longitudinal section taken on line III III, Fig. II. Fig. IV is a part in rear elevation and part in vertical transverse section. Fig. V is a detail view.

Referring to the drawings, 1 represents the body of the machine, supported on ground wheels 2.

3 represents the cylinder, 4 the concave, and 5 the feed chute of the machine, all of which may be of any well known form of construction.

6 represents a carrier made in the usual manner to permit the grain to fall therethrough while the straw is carried up and deposited over the upper end of the carrier. The lower end of the carrier is supported on a shaft 7, and the upper end on a shaft 8, the carrier at both ends passing, of course, around pulleys on the shafts, as usual.

9 represents a stationary board or strip located within the carrier at the cylinder end, and which prevents grain dropping through the carrier beneath the upper edge 10 of the board. Within the carrier is also a chute board 11, the lower end 12 of which underlaps the upper end 10 of the board 9. The lower end of the chute board 11 is supported by links 13, and its upper end is loosely supported on the shaft 8, or otherwise.

15 is an eccentric rod connected to the chute board 11 at 16, and connected by a strap 19 to an eccentric 20 on the shaft 8. It will thus be seen that as the shaft 8 is turned, the chute board 11 will have a longitudinal vibration imparted to it. On the upper surface of the chute board 11 is a V-shaped deflector 21, with its apex in the center of the board from which it inclines in an outward and downward direction, as shown in Fig. V.

The straw which is carried by the carrier 6 is discharged over the upper end of the carrier, as shown by the full arrows in Fig. II, and drops onto another carrier 22, and by this carrier 22 is moved back toward the front of the machine, and passes onto another carrier 23, from whence it falls onto a screen 24, which carries it to the discharge mouth 25 of the machine which is beneath the feeding platform. As the straw passes around the upper end of the carrier 6, and falls onto the carrier 22, it is inverted or turned upside down, so that the grain which was being suspended in the upper part of the straw as it passed up the carrier 6, now falls freely from the straw onto the raddle of the carrier 22, and falls through the space 26 between the carrier 22 and the carrier 23, when it reaches this point. Any grain that is carried in the straw after reaching the carrier 23, and which may be separated from the straw while on the carrier 23, drops onto the inclined bottom 27 beneath the carrier 23, and is moved by the carrier to its upper end, where it falls onto a chute 28 that receives the grain which falls through the space 26, and by this chute is delivered onto a shoe 29. The grain that falls onto the chute board 11 from the carrier 6 moves toward the outer edges of the board, which movement is caused by the deflector 21, and as it falls from the board it drops onto the chute 28, as shown by the featherless arrows, Fig. II, and passes from the chute 28 onto the shoe 29. By the use of the deflector 21, the grain is deposited at each side of the machine, and at each side of the straw, which passes from the carrier 22 onto the carrier 23, where it finds a more open and ready passage onto the chute 28, than it would if it fell and were spread out entirely across the chute board 21, the obstruction of the straw to the passage of this grain at the edges of the body of the straw being much less than at the central portion where the straw moves in a thicker bed.

As the straw falls from the carrier 6, it is agitated by fingers 30, secured to a shaft 31, having a crank 32, connected by a link 33 to the eccentric strap 19, as shown in Fig. II, so that the fingers 30 are constantly vibrated and serve to loosen up the straw coming in contact with them.

34 represents a comb or fixed fingers, depending from the top of the machine, above the fingers 30, and which deflects the straw downwardly onto the fingers 20.

The grain falling onto the shoe 29, passes through a screen 35, shown by dotted lines in Fig. II, and from the screen drops onto the bottom of the shoe and passes through an opening 36 into a chute 37, which conducts it to the place of discharge from the machine. As the grain passes through the shoe, the tailings are blown by a fan 38 to the upper part of the shoe, where they pass through an opening 40 onto a shoe 41, the shape of which is shown in Fig. IV, and this chute carries the tailings to a spout 42, leading to a conveyer 43 that conducts the tailings back to the cylinder of the machine. The chaff from the screen 35 of the shoe 29 passes down through a chute 44, (see Fig. II,) which conducts it to side fans 45, (see Figs. II and III,) from where it passes under the force of the fans through chutes 46, which conduct it to the front of the machine, the chaff passing from the chutes through openings 47 in the inner sides of the front ends of the chutes, so that the chaff is deposited at the same place as the straw from the machine.

The chute 44 is V-shaped, as shown by dotted lines, Fig. III, so that part of the chaff is conveyed to one of the fans 45, and the rest to the other fan 45.

48 represents a fan for discharging a current of air through the screen 24, as shown in Fig. II.

The screen 24 is supported at one end by a link 49, and at the other end by an eccentric 50, on a shaft 51, so that the rotation of the shaft vibrates or agitates the screen. The grain falling from the screen 24, drops onto an inclined chute board 52, a top view of which is shown in Fig. III, one side of the chute board being inclined, as shown at 53, and this chute board deposits into the trough 42, so that any grain falling onto this chute board is conducted back to the cylinder of the machine with the tailings falling from the chute 41.

With my improved machine, the straw has a long distance to travel after leaving the cylinder, and before being discharged from the machine, and it is also inverted or turned over upside down while still within the machine, and before it reaches the discharge passage 26 of the grain. I thus am enabled to thoroughly separate the grain from the straw, and at the same time my improved machine is capable of being made considerably shorter than the ordinary machine, while the travel of the straw is relatively considerably greater.

It will be observed that there is a strip or board 22$^a$ within the carrier 22, so that any grain dropping through the raddle of the carrier will be conducted down to the lower end of the carrier, so as to drop onto the incline 28 and be conducted to the shoe 29.

While I have set forth above the preferred construction and arrangement of parts for effecting the principal objects of my invention, it will be understood that the structural features may be varied. For example, the second carrier may be arranged in a plane above the first instead of below, and an intermediate carrier employed to lift the straw from the first carrier to the second, instead of allowing it to fall by gravity. Such intermediate carrier may be of the usual endless belt construction, or a blast fan may be employed. The novel characteristic of the machine being the inverting of the mass of straw while changing its direction of movement, the particular means for effecting this object may be varied without departing from the true scope of the invention.

I claim as my invention—

1. In a thrashing machine, the combination of a cylinder, means for conducting the material rearwardly from the cylinder, and means adapted to receive the material from the first mentioned means and conduct it forwardly, and which delivers the material at the cylinder end of the machine, substantially as set forth.

2. In a thrashing machine, the combination with a cylinder, of a carrier for receiving the material and conducting it therefrom toward the rear of the machine, and a second carrier arranged to receive the material from the first but running in an opposite direction thereto and delivering at the cylinder end of the machine, whereby the material is inverted and the direction of its motion is changed during its passage through the machine, substantially as described.

3. In a thrashing machine, the combination with a cylinder, of two carriers arranged in different planes, one of which is adapted to receive the material from the cylinder and conduct it rearwardly therefrom and the other of which receives the material from the first by gravity and conducts it forwardly and finally delivers it at the cylinder end of the machine, substantially as described.

4. In a thrashing machine, the combination with a cylinder, a carrier for conducting the material rearwardly from the cylinder, and a second carrier arranged below the first mentioned carrier and adapted to receive the material therefrom by gravity and to conduct it forwardly again whereby the material is inverted and turned within the machine and eventually discharged at the cylinder end thereof, substantially as set forth.

5. In a thrashing machine, a carrier for conducting the straw rearwardly from the cylinder, and a carrier adapted to receive the straw from the first mentioned carrier and discharge it at the cylinder end of the machine whereby the moving mass is inverted in its passage from one carrier to the other and its direction of motion is changed within the machine, substantially as described.

6. In a thrashing machine, the combination with a cylinder, a carrier adapted to receive the material from the cylinder and conduct it in a rearwardly direction, and a second carrier beneath the first and adapted to receive the straw therefrom by gravity and to discharge the same beyond the cylinder end of the machine and beneath the platform thereat, substantially as described.

7. In a thrashing machine, the combination with a cylinder, a carrier adapted to receive the material from the cylinder and conduct it toward the rear of the machine, a second carrier adapted to receive the material from the first mentioned carrier and conduct it back toward the front of the machine and discharge it thereat, and means for agitating the material as it passes from one carrier to the other, substantially as set forth.

8. In a thrashing machine, the combination of a cylinder, a carrier for receiving the material from the cylinder, and conducting it toward the rear of the machine, carriers 22 and 23 beneath the first mentioned carrier, and having a space 26 between them, and a chute board located within the first mentioned carrier and having a deflector 21, substantially as and for the purpose set forth.

9. In a thrashing machine, the combination of a cylinder, a carrier for receiving the straw from the cylinder, and which conducts it to the rear of the machine, a carrier 22 beneath the first mentioned carrier, a shoe 29 beneath the carrier 22, and provided with an inclined bottom having openings 36 and 40, a chute 37 communicating with the opening 36, and a chute 41, communicating with the opening 40, and a conveyer 43, substantially as and for the purpose set forth.

10. In a thrashing machine, the combination of a screen and a shoe 29 located under said screen for catching the grain, chutes 46 having openings 47 located on each side of the machine, and a V-shaped chute 44 for catching the chaff from the screen and conveying it to said chutes 46, substantially as set forth.

11. In a thrashing machine, the combination of a screen and a shoe 29 located under said screen for catching the grain, a fan 38 for removing the tailings from the grain, a V-shaped chute 44 for catching the chaff from the screen, chutes 46 having openings 47 located on each side of the machine and communicating with the chute 44, and fans 45 located in the chutes 46, substantially as shown and described.

12. In a thrashing machine, the combination of a cylinder, carriers for conducting the straw within the machine first in a rearwardly direction and then in a forwardly direction, whereby the straw is deposited at the front end of the machine, and fans adapted to receive the chaff of the machine and conduct it to the front end of the machine through chutes 46, substantially as and for the purpose set forth.

13. In a thrashing machine, the combination of a cylinder, carriers for conducting the straw toward the rear of the machine, and then forwardly, a screen for receiving the straw from the carriers, and a chute 52 beneath the screen, substantially as and for the purpose set forth.

14. In a thrashing machine, the combination of a cylinder, carriers for conducting the straw toward the rear of the machine, and then forwardly, a screen for receiving the straw from the carriers, and a chute 52 beneath the screen, said chute having an inclined side 53, substantially as and for the purpose set forth.

15. In a thrashing machine, the combination of a cylinder 3, a carrier 6 for conveying the straw to the rear of the machine, carriers 22 and 23, for carrying it to the front of the machine, a screen 24 for receiving the straw from the carriers and for discharging the straw from the machine, chutes 46 located at the side of the machine and a chute 44 communicating with the chutes 46 for conveying away the chaff, a chute 52 under the screen 24 for conveying away the grain, fans 45 located in the chutes 46, a fan 48 for forcing air through the screen 24 and a conveyer 43 for carrying the tailings of the machine to the cylinder 3, substantially as and for the purpose set forth.

WESLEY BUTLER.

In presence of—
HELEN I. CROUL,
C. M. LEONARD.